US009547418B2

(12) United States Patent
Lee

(10) Patent No.: US 9,547,418 B2
(45) Date of Patent: Jan. 17, 2017

(54) ELECTRONIC DEVICE AND METHOD OF ADJUSTING USER INTERFACE THEREOF

(71) Applicant: Chiun Mai Communication Systems, Inc., New Taipei (TW)

(72) Inventor: Ko-Han Lee, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/600,417

(22) Filed: Jan. 20, 2015

(65) Prior Publication Data

US 2016/0055825 A1    Feb. 25, 2016

(30) Foreign Application Priority Data

Aug. 25, 2014    (CN) .......................... 2014 1 0420463

(51) Int. Cl.
*G06F 3/041* (2006.01)
*G06F 3/0482* (2013.01)
*G01J 1/02* (2006.01)
*G01H 3/10* (2006.01)
*G06K 9/00* (2006.01)
*G06F 3/0481* (2013.01)
*G06F 3/147* (2006.01)
*G09G 5/00* (2006.01)

(52) U.S. Cl.
CPC ............ *G06F 3/0482* (2013.01); *G01H 3/10* (2013.01); *G01J 1/0219* (2013.01); *G06F 3/04817* (2013.01); *G06F 3/147* (2013.01); *G06K 9/00087* (2013.01); *G09G 5/00* (2013.01); *G09G 2320/0626* (2013.01); *G09G 2340/14* (2013.01); *G09G 2354/00* (2013.01); *G09G 2360/144* (2013.01); *G09G 2380/10* (2013.01)

(58) Field of Classification Search
None
See application file for complete search history.

(56) References Cited

U.S. PATENT DOCUMENTS

| 2011/0082620 A1* | 4/2011 | Small | B60K 35/00 701/31.4 |
|---|---|---|---|
| 2014/0237400 A1* | 8/2014 | Higgins | G06F 3/048 715/765 |
| 2014/0292678 A1* | 10/2014 | Hayashi | G06F 3/0412 345/173 |
| 2014/0302818 A1* | 10/2014 | Fyke | G06F 21/32 455/411 |
| 2015/0213088 A1* | 7/2015 | Joshi | H04W 4/02 707/722 |

(Continued)

*Primary Examiner* — Joseph Haley
(74) *Attorney, Agent, or Firm* — Zhigang Ma

(57) ABSTRACT

An electronic device includes a control unit, an environment sensor unit configured to detect working environment of the electronic device to get a detected environment information, a storage unit configured to store a preset environment threshold, and a display unit. The control unit is configured to compare the detected environment information with the preset environment threshold, determine a type of the working environment of the electronic device, and controls the display unit to adjust user interface or interaction mode of the electronic device, according to the type of the working environment of the electronic device. A method of adjusting a user interface of an electronic device is also provided.

15 Claims, 2 Drawing Sheets

(56) References Cited

U.S. PATENT DOCUMENTS

| | | | | |
|---|---|---|---|---|
| 2015/0286372 A1* | 10/2015 | Swindell | ............... | G06F 3/0481 715/762 |
| 2015/0304171 A1* | 10/2015 | Kim | ....................... | H04L 41/22 715/733 |
| 2015/0365492 A1* | 12/2015 | Kalan | ................ | G06Q 10/0637 700/83 |

* cited by examiner

ELECTRONIC DEVICE AND METHOD OF ADJUSTING USER INTERFACE THEREOF

FIELD

The subject matter herein generally relates to an electronic device and a method of adjusting user interface of the electronic device.

BACKGROUND

Display screens of electronic devices such as a mobile phone, personal data assistants (PDAs), personal computers, game consoles and so on, are developing towards big sizes. So, the electronic device generally includes a user interface with a big size.

BRIEF DESCRIPTION OF THE DRAWINGS

Implementations of the present technology will now be described, by way of example only, with reference to the attached figures.

DETAILED DESCRIPTION

Figure 1:
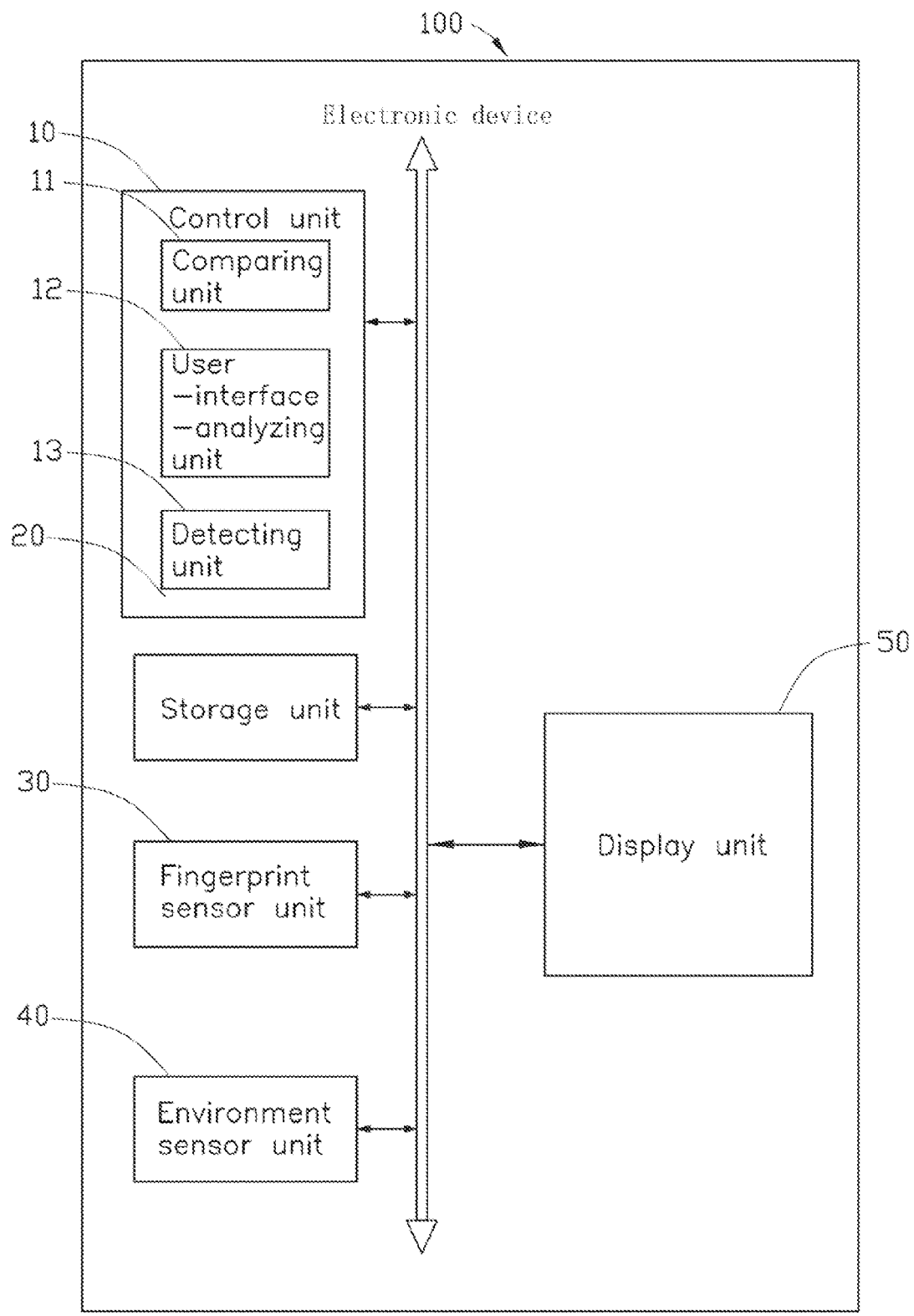
FIG. 1 is a diagrammatic view of an electronic device in accordance with an example of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an electronic device. The electronic device can include a control unit, an environment sensor unit configured to detect working environment of the electronic device to get a detected environment information, a storage unit configured to store a preset environment threshold, and a display unit. The control unit is configured to compare the detected environment information with the preset environment threshold, determine a type of the working environment of the electronic device, and controls the display unit to adjust user interface or interaction mode of the electronic device, according to the type of the working environment of the electronic device.

The present disclosure is described further in relation to a method of adjusting a user interface of an electronic device. The method can include: detecting a current working environment and a current working status of the electronic device by a control unit, a fingerprint sensor unit and an environment sensor unit to get a detected environment information and a detected working status; comparing the detected environment information and/or the detected working status with a preset environment threshold and/or a preset status by a comparing unit to determine a type of the current working environment and the current working status of the electronic device; and controlling a display unit to automatically adjust the user interface by the control unit, according to the type of the current working environment and the current working status of the electronic device.

FIG. 1 illustrates an electronic device 100 of an embodiment of the present disclosure. The electronic device 100 can include a control unit 10, a storage unit 20, a fingerprint sensor unit 30, an environment sensor unit 40 and a display unit 50.

The storage unit 20 can be configured to store a plurality of preset fingerprint information and environment thresholds. The fingerprint sensor unit 30 can be configured to detect a user's fingerprint to get a detected fingerprint. The control unit 10 can be configured to compare the detected fingerprint with the predetermined fingerprint, and control the display unit 50 to change user interface basing on a compared result. The environment sensor unit 40 can be configured to detect a working environment of the electronic device 100 to get a detected environment information. The control unit 10 can further be configured to compare the detected environment information with the preset environment threshold to determine the current working environment of the electronic device 100, and control the electronic device 100 to change the user interface or interaction mode basing on the current working environment of the electronic device 100.

The control unit 10 can include a comparing unit 11, a user-interface-analyzing unit 12 and a detecting unit 13. The comparing unit 11 can be configured to compare the detected fingerprint with the preset fingerprint stored in the storage unit 20, and compare the detected environment information with the preset environment threshold stored in the storage unit 20, to determine the current working environment and status of the electronic device 100. The user-interface-analyzing unit 12 can be configured to determine the user interface matching with the working environment and the status of the electronic device 100, and transmit the user interface to the display unit 50 to be displayed. The detecting unit 13 can be configured to detect the working environment of the electronic device 100 according to the type of network access such as internet of things or internet of cars or others. The control unit 10 controls the electronic device 100 to adjust the user interface or interactive modes according to the working environment.

In an example, when the detecting unit 13 detects that the electronic device 100 is coupled with the internet of cars, and determines that the electronic device 100 is in a mode of In-Vehicle, the control unit 10 controls the electronic device 100 to automatically amplify the hands-free button, and automatically broadcast the messages and the caller ID. In another example, when the electronic device 100 is positioned in darkness such as pocket or bag, the detecting unit 13 detects the type of the internet of things such as intelligent home furnishing internet of things to which the electronic device 100 access, and determines locations where the electronic device 100 locates, such as a sitting room, the control unit 10 can control the electronic device 100 to enhanced ring volume. In an alternative example, when the electronic device 10 accesses the intelligent home furnishing internet of things, if the detecting unit 13 detects that the electronic device 10 has built relationship with a TV, the control unit 10 will control the display unit 50 to output a simulation of remote controller interface, which makes the electronic device 10 control the TV. In an additional example, when the electronic device 100 is in a place of noisy or light intensity changing dramatically, the detecting unit 13 detects the type of the internet of things to which the electronic device 100 access, and determines locations where the electronic device 100 locates, such as bars and dance halls. The control unit 10 can control the electronic device 100 to automatically increase the display brightness, or open calls vibration and enlarge the sound volume.

Additionally, the detecting unit 13 can be configured to detect full time user's habits of using the electronic device 100, and record the working environment of the electronic device 100 in a particular time period, such as a period from 22 pm of every day to 6 am of the next day. Thus, the electronic device 100 can build behavior patterns of the user in a long term, thereby making humanized adjustment to the user interface.

The comparing unit 11 can be configured to compare the detected fingerprint from the fingerprint sensor unit 30 with the preset fingerprint stored in the storage unit 20, to determine the user's identity. The control unit 10 controls the electronic device 100 to automatically show or hide programs or file paths related to personal privacy, according to the user's identity. If the user is the owner of the electronic device 100, the electronic device 100 will automatically show the programs or the file paths of personal privacy. If the user is a visitor, the electronic device 100 will automatically hide the programs or the file paths of personal privacy. Simultaneously, the control unit 10 controls the electronic device 100 to do personalized ranking for commonly used functions menus, according to the user's identity, to adapt to different operation customs of the users.

The comparing unit 11 can be further configured to determine the user holding the electronic device 100 with the right hand or the left hand, according to the detected fingerprint detected by fingerprint sensor unit 30, and determine a direction of the fingers relative to the electronic device 100. The control unit 10 controls the display unit 50 to automatically adjust the user interface according to which one of the right hand or the left hand holding the electronic device 100. In at least one embodiment, when the comparing unit 11 determines that the right hand holds the electronic device 100, the control unit 10 controls the display unit 50 to reduce the dial or text input interface and adjust the dial or text input interface to the right part of the user interface, which is convenient for the right hand to operate the electronic device 100. When the comparing unit 11 determines that the left hand holds the electronic device 100, the control unit 10 controls the display unit 50 to reduce the dial or text input interface and adjust the dial or text input interface to the left part of the user interface, which is convenient for the left hand to operate the electronic device 100. Simultaneously, the fingerprint sensor unit 30 determines holding direction of the electronic device 100 according to the detected fingerprints. When the electronic device 100 is in a horizontal state, which results in an orientation sensor of the electronic device 100 cannot work, the control unit 10 controls the display unit 50 to automatically adjust an orientation of the user interface of the electronic device 100 according to the holding direction of the electronic device 100. In at least one embodiment, the holding direction can includes a horizontal hold and a vertical hold, wherein, in the horizontal hold, the electronic device 100 is substantially perpendicular to a forearm with the hand holding the electronic device 100, in the vertical hold, the electronic device 100 is substantially parallel to the forearm with the hand holding the electronic device 100.

The environment sensor unit 40 can be configured to detect light brightness of the working environment of the electronic device 100. The control unit 10 controls the electronic device 100 to automatically enter different display modes, according to comparison results of the current light brightness with the preset light brightness threshold stored in the storage unit 20.

The environment sensor unit 40 can be further configured to detect moving speed of the electronic device 100 in use to get a detected moving speed. The comparing unit 11 compares the detected moving speed with a preset moving speed threshold stored in the storage unit 20. When the detected moving speed is greater than the preset moving speed threshold, the control unit 10 controls the display unit 50 to automatically enlarge operation buttons and menus which may be used. In an example, when the user is in walks or movement, the control unit 10 controls the display unit 50 to enlarge the operation buttons and menus, when the user is driving, the control unit 10 controls the display unit 50 to enlarge the hand-free button, to enhance operation accuracy for the user in movement.

The environment sensor unit 40 can be further configured to detect temperature and moisture of the working environment of the electronic device 100 to get a detected temperature and a detected moisture. When the detected moisture of the working environment is greater than a preset moisture threshold, or/and the detected temperature of the working environment is less than a preset temperature threshold, the control unit 10 controls the display unit 50 to automatically enlarge the operation buttons and menus, and automatically adjusts sensitivity of the display unit 50 according to the detected moisture or/and temperature.

The environment sensor unit 40 can be further configured to detect noise of the working environment of the electronic device 100. When the noise of the working environment is larger than a preset noise threshold, the control unit 10 controls the electronic device 100 to automatically show texts or pictures to assist voice projects of the electronic device 100, to increase recognition degrees in the noise.

The environment sensor unit 40 can be further configured to detect that the electronic device 100 is picked up from a placement by the right hand or the left hand of the user. When the environment sensor unit 40 detects that the electronic device 100 is picked up from a left side of the electronic device 100, the environment sensor unit 40 determines that the electronic device 100 is hold by the left hand of the user. When the environment sensor unit 40 detects that the electronic device 100 is picked up from a right side of the electronic device 100, the environment sensor unit 40 determines that the electronic device 100 is hold by the right hand of the user. The control unit 10 controls the display unit 50 to automatically adjust the user interface according to which hand of the user holding the electronic device 100. When the environment sensor unit 40 determines that the electronic device 100 is operated by only one hand of the user, the control unit 10 controls the display unit 50 to reduce the dial or text input interface and adjust the dial or text input interface to the left part or the right part of the user interface, which is convenient for the left hand or the right hand to operate the electronic device 100.

The environment sensor unit 40 can be further configured to detect gender, health status, motion state, age of the user, the first time using the electronic device 100 or not for the user, eyes of the user gazing the electronic device 100 or not, interaction environment and status when the electronic device 100 is used with a wearable device.

Figure 2:
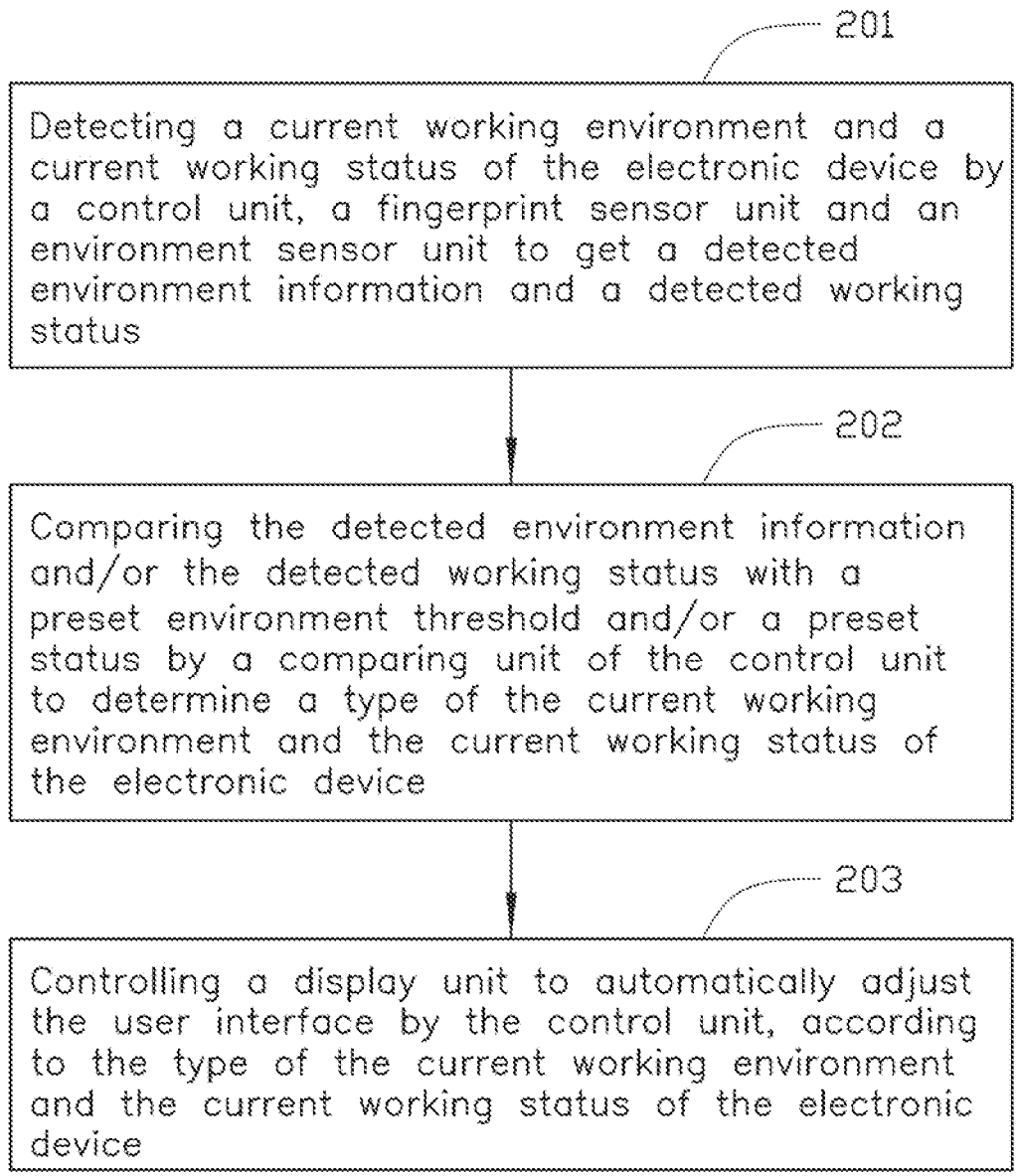
FIG. 2 is a flowchart of a method of adjusting a user interface of the electronic device in FIG. 1.

Referring to FIG. 2, a flowchart is presented in accordance with an example embodiment which is being thus illustrated. The example method is provided by way of example, as there are a variety of ways to carry out the method. The method 200 described below can be carried out using the configurations illustrated in FIG. 1, for example, and various elements of the figure are referenced in explaining the example method. Each block shown in FIG. 2 represents one or more processes, methods or subroutines, carried out in the exemplary method. Additionally, the illustrated order of blocks is by example only and the order of the blocks can change according to the present disclosure. The exemplary method for adjusting user interface of an electronic device is illustrated in FIG. 2. The exemplary method can be executed at an electronic device and begin at block 201.

At block 201, a current working environment and a current working status of the electronic device is detected to get a detected environment information and a detected working status. In at least an embodiment, the current working environment and the current working status of the electronic device is detected by a control unit, a fingerprint sensor unit and an environment sensor unit. At this block, in detail, the environment sensor unit can be configured to detect light brightness of the current working environment of the electronic device. The environment sensor unit can be further configured to detect moving speed of the electronic device. The environment sensor unit can be further configured to detect temperature and moisture of the current working environment of the electronic device to get a detected temperature and a detected moisture. The environment sensor unit can be further configured to detect noise of the current working environment of the electronic device. The environment sensor unit can be further configured to detect that the electronic device is picked up from a placement by the right hand or the left hand of the user. The environment sensor unit can be further configured to detect gender, health status, motion state, age of the user, the first time using the electronic device or not for the user, eyes of the user gazing the electronic device or not, interaction environment and status when the electronic device is used with a wearable device. The control unit can include a detecting unit configured to detect the current working environment of the electronic device according to the type of network access such as internet of things or internet of cars or others.

At block 202, the detected environment information and/or the detected working status are compared with a preset environment threshold and/or a preset status to determine a type of the current working environment and the current working status of the electronic device. In at least an embodiment, the control unit can include a comparing unit comparing a detected user's fingerprint detected by the fingerprint sensor unit and the environment information detected by the environment sensor unit with the preset fingerprint and environment threshold stored in a storage unit, to determine a type of the current working environment and the current working status of the electronic device.

At block 203, the electronic device is controlled to adjust the user interface according to the type of the current working environment and/or the current working status. In as least an embodiment, the control unit controls a display unit of the electronic device to automatically adjust the user interface, according to the type of the current working environment and the current working status of the electronic device. At this block, in detail, the control unit can further include a user-interface-analyzing unit. The user-interface-analyzing unit can be configured to determine the user interface matching with the type of the current working environment and the current working status of the electronic device, and transmit the user interface to the display unit to be displayed.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
   a processor;
   an environment sensor unit configured to detect working environment of the electronic device to get a detected environment information;
   a display unit; and
   a storage unit configured to store a preset environment threshold, a preset moving speed threshold, and one or more programs, which when the one or more programs executed by the processor, cause the processor to:
   compare the detected environment information with the preset environment threshold;
   determine a type of the working environment of the electronic device;
   control the display unit to adjust user interface or interaction mode of the electronic device, according to the type of the working environment of the electronic device;
   detect moving speed of the electronic device in use;
   compare the detected moving speed with the preset moving speed threshold, and
   control the display unit to enlarge operation buttons and menus when the detected moving speed is greater than the preset moving speed threshold.

2. The electronic device of claim 1, wherein the one or more programs further cause the processor to:
   detect a working environment of the electronic device according to a type of network access of the electronic device to get another detected environment information;
   compare the detected working environment with the preset environment threshold to determine the type of the working environment and status of the electronic device;
   determine the user interface matching with the type of working environment and the status of the electronic device; and
   transmit the user interface to the display unit to be displayed.

3. The electronic device of claim 2, wherein the environment sensor unit is configured to detect light brightness of the working environment of the electronic device, the one or more programs further cause the processor to:
compare a current light brightness of the working environment from the environment sensor unit with a preset light brightness threshold; and
control the electronic device to enter different display modes according to comparison results of the current light brightness with the preset light brightness threshold.

4. The electronic device of claim 2, wherein the environment sensor unit is configured to detect temperature and moisture of the working environment of the electronic device to get detected temperature and detected moisture, when the detected temperature or detected moisture of the working environment is greater or less than a preset temperature or a preset moisture threshold, the one or more programs further cause the processor to control the display unit to enlarge operation buttons and menus, and adjust sensitivity of the display unit according to the detected temperature or moisture.

5. The electronic device of claim 2, wherein the environment sensor unit is configured to detect noise of the working environment of the electronic device, the one or more programs further cause the processor to compare a detected noise of the working environment from the environment sensor unit with a preset noise threshold, when the detected noise of the working environment is larger than the preset noise threshold, the one or more programs further cause the processor to control the electronic device to show texts or pictures to assist voice projects of the electronic device.

6. The electronic device of claim 2, further comprising a fingerprint sensor unit, wherein the fingerprint sensor unit is configured to detect a user's fingerprint, the storage unit is further configured to store a plurality of preset fingerprints, the one or more programs further cause the processor to compare a detected user's fingerprint from the fingerprint sensor unit with a preset fingerprints stored in the storage unit and control the display unit to adjust the user interface.

7. The electronic device of claim 6, wherein the one or more programs further cause the processor to estimate a user's identity according to the detected fingerprint, and control the electronic device to automatically show or hide programs or file paths related to personal privacy according to the user's identity.

8. The electronic device of claim 7, wherein the one or more programs further cause the processor to determine holding states of right or left hand holding the electronic device and holding directions of the electronic device according to the detected fingerprint from the fingerprint sensor unit, determine the user interface matching with the holding states and the holding direction of the electronic device working environment and the state of the electronic device, and transmit the user interface to the display unit to display.

9. A method of adjusting a user interface of an electronic device, the method comprising:
detecting a current working environment and a current working status of the electronic device;
getting a detected environment information and a detected working status;
comparing the detected environment information and/or the detected working status with a preset environment threshold and/or a preset status by the control unit to determine a type of the current working environment and the current working status of the electronic device;
controlling a display unit to automatically adjust the user interface by the control unit, according to the type of the current working environment and the current working status of the electronic device;
detecting moving speed of the electronic device in use;
comparing the detected moving speed with a preset moving speed threshold, and
controlling the display unit to enlarge operation buttons and menus when the detected moving speed is greater than the preset moving speed threshold.

10. The method of claim 9, wherein the preset environment threshold, the preset status, and the preset moving speed threshold are stored in a storage unit.

11. The method of claim 10, further comprising:
compare the environment information detected by the environment sensor unit and a detected user's fingerprint detected by the fingerprint sensor unit with the preset environment threshold and fingerprint stored in a storage unit; and
determine the type of the current working environment and the current working status of the electronic device.

12. The method of claim 11, wherein the environment sensor unit is configured to detect light brightness of the current working environment of the electronic device, the method further comprise:
compare a current light brightness of the working environment from the environment sensor unit with a preset light brightness threshold stored in the storage unit.

13. The method of claim 11, wherein the environment sensor unit is configured to detect temperature and moisture of the current working environment of the electronic device, the method further comprise:
compare a detected temperature and detected moisture from the environment sensor unit with a preset moisture threshold stored in the storage unit.

14. The method of claim 11, wherein the environment sensor unit is configured to detect noise of the current working environment of the electronic device, the method further comprise:
compare a detected noise of the working environment from the environment sensor unit with a preset noise threshold stored in the storage unit.

15. The method of claim 9, further comprising:
determine the user interface matching with the type of the current working environment and the current working status of the electronic device.

* * * * *